United States Patent
Schubert (10) Patent No.: US 10,391,563 B2
(45) Date of Patent: Aug. 27, 2019

(54) HAND-HELD POWER TOOL AND CONTROL METHOD

(71) Applicant: Hilti Aktiengesellschaft, Schaan (LI)

(72) Inventor: Wolfgang Schubert, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 789 days.

(21) Appl. No.: 14/787,192

(22) PCT Filed: Apr. 23, 2014

(86) PCT No.: PCT/EP2014/058164
§ 371 (c)(1),
(2) Date: Oct. 26, 2015

(87) PCT Pub. No.: WO2014/177426
PCT Pub. Date: Nov. 6, 2014

(65) Prior Publication Data
US 2016/0199920 A1    Jul. 14, 2016

(30) Foreign Application Priority Data

Apr. 30, 2013 (EP) ..................... 13165874

(51) Int. Cl.
*B23B 31/12* (2006.01)
(52) U.S. Cl.
CPC ........ *B23B 31/1253* (2013.01); *B23B 31/123* (2013.01); *B23B 2231/06* (2013.01); *B23B 2231/14* (2013.01)

(58) Field of Classification Search
CPC ............ B23B 2231/06; B23B 2231/14; B23B 2231/123; B23B 2231/1253; B23B 2260/07; B23B 31/102; B23B 31/1238
(Continued)

(56) References Cited

U.S. PATENT DOCUMENTS 6,311,787 B1 * 11/2001 Berry ...................... B25F 5/001
173/176
7,552,781 B2 * 6/2009 Zhang .................. B23D 59/001
173/1
(Continued)

FOREIGN PATENT DOCUMENTS

CN          1616194 A       5/2005
CN         201152938 Y     11/2008
(Continued)

*Primary Examiner* — Robert F Long
*Assistant Examiner* — Valentin Neacsu
(74) *Attorney, Agent, or Firm* — Davidson, Davidson & Kappel, LLC (57) ABSTRACT

A hand-held power tool having a machine housing, a motor, a shaft driven by the motor, and a tool socket. The tool socket is mounted on the shaft. The tool socket has a holding space to hold a tool and it has a clamping jaw situated in a link and projecting into the holding space. A carriage coupled to the clamping jaw is provided with a screw drive that has a thread on the carriage and a mating thread on the shaft. An actuation element movable between a first position and a second position is provided in order to select either the operational mode or else the loosening or tightening of the clamping jaws. A switchable coupling is mounted on the tool socket. The switchable coupling alternatingly engages either with the shaft or with the machine housing, depending on the positions of the actuation element.

11 Claims, 5 Drawing Sheets

(58) Field of Classification Search
USPC .................... 173/213, 216, 217; 279/126
See application file for complete search history.

(56) References Cited

U.S. PATENT DOCUMENTS

| | | | | |
|---|---|---|---|---|
| 7,850,404 B2* | 12/2010 | Mack | ............... | B23B 31/1253 |
| | | | | 279/60 |
| 8,070,168 B2* | 12/2011 | Mack | ............... | B23B 31/123 |
| | | | | 279/125 |
| 8,403,339 B2* | 3/2013 | Yaksich | ............... | B23B 31/123 |
| | | | | 279/140 |
| 8,528,658 B2* | 9/2013 | Roehm | ............... | B23B 31/1207 |
| | | | | 173/176 |
| 9,050,660 B2* | 6/2015 | Mack | ............... | B23B 31/123 |
| 9,364,901 B2* | 6/2016 | Yaksich | ............... | B23B 31/123 |
| 9,381,579 B2* | 7/2016 | Schenk | ............... | B23B 45/001 |
| 2005/0121209 A1 | 6/2005 | Shimizu et al. | | |
| 2006/0233621 A1* | 10/2006 | Schell | ............... | B23B 31/1253 |
| | | | | 408/124 |
| 2007/0158086 A1* | 7/2007 | Puzio | ............... | B23B 31/123 |
| | | | | 173/48 |
| 2007/0182108 A1* | 8/2007 | Mack | ............... | B23B 31/1253 |
| | | | | 279/60 |
| 2007/0187908 A1* | 8/2007 | Puzio | ............... | B23B 31/12 |
| | | | | 279/60 |
| 2008/0185794 A1* | 8/2008 | Puzio | ............... | B23B 31/123 |
| | | | | 279/60 |
| 2009/0058019 A1* | 3/2009 | Mack | ............... | B23B 31/123 |
| | | | | 279/114 |
| 2009/0315279 A1* | 12/2009 | Yaksich | ............... | B23B 31/123 |
| | | | | 279/62 |
| 2010/0065293 A1* | 3/2010 | Lohr | ............... | B25B 23/147 |
| | | | | 173/1 |
| 2010/0109262 A1* | 5/2010 | Yu | ............... | B23B 31/123 |
| | | | | 279/60 |
| 2010/0116519 A1* | 5/2010 | Gareis | ............... | B25B 23/147 |
| | | | | 173/176 |
| 2012/0175849 A1* | 7/2012 | Mack | ............... | B23B 31/123 |
| | | | | 279/60 |
| 2012/0274035 A1* | 11/2012 | Schenk | ............... | B23B 31/1238 |
| | | | | 279/60 |
| 2013/0032368 A1* | 2/2013 | Zhang | ............... | B25F 5/029 |
| | | | | 173/1 |
| 2013/0207353 A1* | 8/2013 | Yaksich | ............... | B23B 31/123 |
| | | | | 279/140 |
| 2013/0319707 A1* | 12/2013 | Roehm | ............... | B23B 31/1207 |
| | | | | 173/48 |

FOREIGN PATENT DOCUMENTS

| | | |
|---|---|---|
| DE | 102006005241 | 8/2007 |
| DE | 102009026075 | 1/2011 |
| EP | 2 517 811 A1 | 10/2012 |
| EP | 2 537 612 A2 | 12/2012 |
| GB | 2460959 | 12/2009 |
| WO | WO2006/111114 | 10/2006 |

* cited by examiner

HAND-HELD POWER TOOL AND CONTROL METHOD

The present invention relates to a hand-held power tool, especially to an electric screwdriver, whose clamping jaws can be tightened and loosened by means of a motor.

BACKGROUND

European patent application EP 2 537 612 A2 describes an electric screwdriver with a tool socket whose clamping jaws can be tightened and loosened by a user employing the motor of the electric screwdriver. The electric screwdriver comprises a coupling plate that is connected in the drive train between the motor and the tool socket. The user can move the coupling plate axially and, in a first position for the operational mode, the coupling plate connects the motor to the tool socket. In the second position, the tool socket is uncoupled from the motor, whereby a screw drive is coupled to the motor in order to tighten or loosen the clamping jaws. A through hole with an internal thread is provided in the tool socket for the screw drive, and a rotor with a corresponding mating thread is inserted into said internal thread.

European patent application EP 2 517 811 A1 describes an electric screwdriver with a tool socket. The tool socket is driven by a hollow spindle in which a freely rotatable screw drive is arranged. The screw drive is coupled to the clamping jaw. The hollow spindle can be coupled to the motor whenever desired. This is done by means of an axially movable gear stage that, in a first position, drives the hollow spindle and the screw drive for the operational mode and that, in a second position, only drives the screw drive in order to tighten or loosen the clamping jaws.

SUMMARY OF THE INVENTION

The present invention provides a hand-held power tool having a machine housing, a motor, a shaft driven by the motor and a tool socket. The tool socket is mounted on the shaft. The tool socket has a holding space to hold a tool, and it has a clamping jaw, preferably several clamping jaws, for example, three clamping jaws, which are situated in a link and which project into the holding space. A carriage that is coupled to the clamping jaw is provided with a screw drive. The screw drive has a thread on the carriage and a mating thread on the shaft. An actuation element that can be moved by a user between a first position and a second position is provided in order to select either the operational mode or else the loosening or tightening of the clamping jaws. A switchable coupling is mounted on the tool socket. The switchable coupling alternatingly engages either with the shaft or with the machine housing, depending on the positions of the actuation element. In the first position, the switchable coupling engages only with the shaft and, in the second position, it engages only with the machine housing. Since the switchable coupling is mounted on the tool socket, it is thus alternatingly coupled to the shaft and to the machine housing.

The attachment of the switchable coupling to the tool socket permits a compact and sturdy structure. The shaft that drives the tool socket does not require a through hole, which is laborious to create, without having to restrict the functionality, for example, vis-à-vis European patent application EP 2 517 811 A1.

The present invention provides that the tool socket is mounted on the shaft so that it can rotate relative thereto. The shaft is permanently coupled to the motor. The shaft is preferably connected directly to a gear or to the motor. Moreover, the shaft is preferably configured in one piece. The transmission of force and torque from the motor to the tool socket is efficient due to the small number of components arranged in the power flow. Furthermore, it is ensured that the transmission of torque for the operational mode takes place via the switchable coupling as well as via the screw drive. One embodiment provides that the mating thread is configured as a blind hole in the shaft.

A control method for the hand-held power tool having the tool socket, the movable clamping jaws and the actuation mechanism for selecting between driving the tool socket or else tightening or loosening the clamping jaws by means of a motor comprises the following steps. A torque limiter is activated when an electric transmitter indicates that the actuation mechanism is set to tightening or loosening. The torque output of the motor is limited to a switch-off value that is coordinated with the tightening and loosening of the clamping jaws. The user does not have the possibility to influence the switch-off value, thus preventing improper operation. The switch-off value is typically relatively low, namely, 10 N/m to 15 N/m, for instance, 12 N/m, as compared to the torque output during operation. The motor is deactivated once the switch-off value has been reached. The tool is now tightly clamped.

One embodiment provides that the hand-held power tool has an indexing mechanism with an electric transmitter. The transmitter generates a signal (second signal) that exhibits the selected speed ratio. The torque limiter is activated in response to the signal of the actuation mechanism. The torque output of the motor, taking the second signal into account, is limited in such a way that a torque that is coordinated with the switch-off value for the tightening and loosening of the clamping jaws is output by the indexing mechanism. The motor is deactivated once the setpoint value has been reached. The tool is now tightly clamped.

BRIEF DESCRIPTION OF THE DRAWINGS

The description below explains the invention on the basis of embodiments given by way of example and figures. The figures show the following.

Unless otherwise indicated, the identical or functionally equivalent elements are designated by the same reference numerals in the figures.

DETAILED DESCRIPTION

Figure 1:
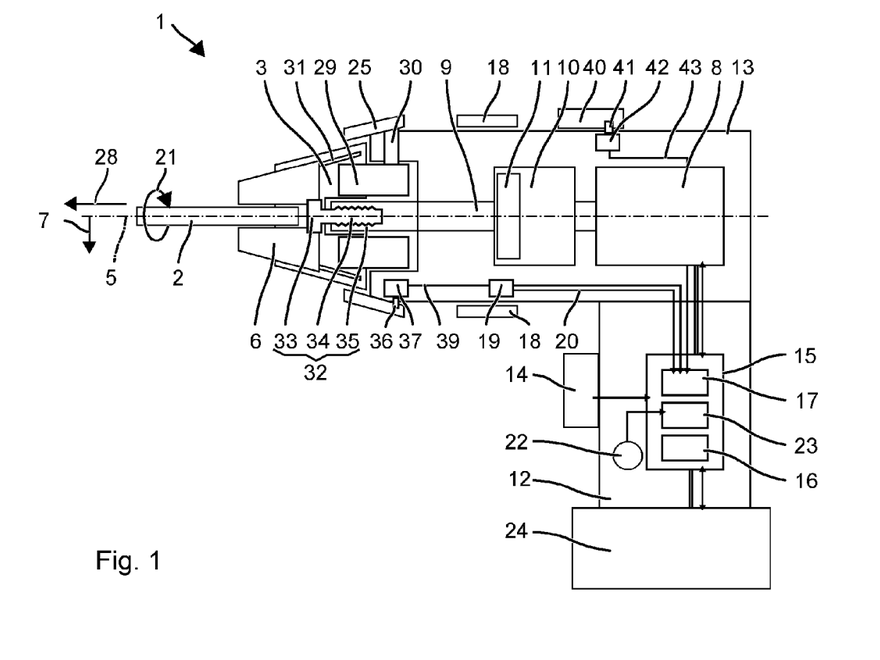
FIG. 1 a schematic view of an electric screwdriver.
Figure 2:
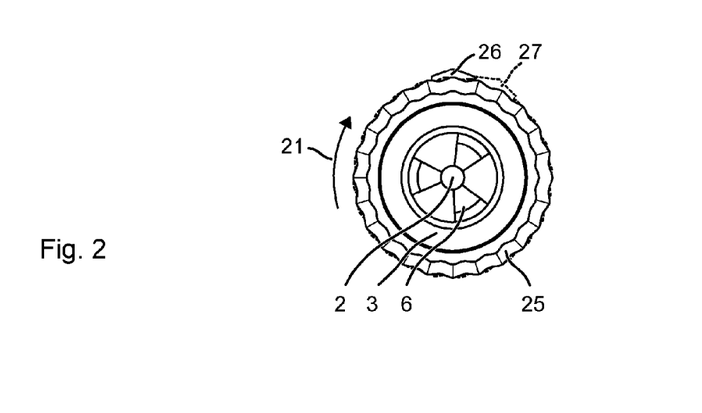
FIG. 2 the electric screwdriver in a top view.

FIG. 1 shows a schematic structure of a hand-held electric screwdriver 1 from the side, FIG. 2 shows a top view from the side of the tool. The electric screwdriver 1 is designed for a rotating tool 2, for example, a screwdriver bit 2, a drill, a countersink, or a milling head.

The electric screwdriver 1 has a tool socket 3 into whose holding space 4 the tool 2 can be inserted and clamped coaxially to the working axis 5. The tool socket 3 has several, for instance, three, clamping jaws 6 that can be moved in the radial direction 7. The clamping jaws 6 clamp the tool 2 between them and, in this manner, they non-rotatably affix the tool 2 to the tool socket 3.

The tool socket 3 can be driven by a motor 8 so as to rotate around the working axis 5. The tool socket 3 is mounted on a shaft 9. The shaft 9 is coupled to the motor 8. Several drive components such as, for example, a gear 10 and a mechanical slip clutch 11, can be interconnected between the motor 8 and the shaft 9. The shaft 9 is coupled to the motor 8 so as to constantly rotate. The uncoupling is carried out by safety clutches that the user cannot influence such as the slip clutch 11.

The electric screwdriver 1 has a handle 12 that is attached to the machine housing 13. With the handle 12, the user can hold and guide the electric screwdriver 1 during operation.

The user can start up the motor 8 by means of a main switch 14. A motor control unit 15 actuates the motor 8 in response to a control signal triggered by the main switch 14. The motor control unit 15 can comprise, for example, a speed controller 16 that serves to regulate the speed of the shaft 9 to a setpoint value. The motor 8 is preferably switched off automatically as soon as the user releases the main switch 14. The motor control unit 15 of the electric screwdriver 1 has a means that serves as a torque limiter 17 for the motor 8. The torque limiter 17 deactivates the motor 8 once an output torque has reached a set switch-off value. For this purpose, for example, the torque limiter 17 determines the mean power consumption of the motor 8 as a measure of its output torque. The switch-off value can be preselected by a user. A selector switch, for example, a rotatable ring 18 around the machine housing 13, has several switching positions that correspond to different switch-off torques. A sensor 19, for instance, a track contact 19, picks up the various switching positions and transmits an appropriate control signal 20 to the torque limiter 17.

The user can select the rotational direction 21 of the tool socket 3 by means of a selector switch 22. The selector switch 22 can influence the rotational direction 21 mechanically, for example, by means of a changeover switch, or else electronically by means of an appropriate rotational direction control unit 23 of the motor control unit 15.

The power is supplied to the electric screwdriver 1 by the mains network or by a battery 24.

The clamping jaws 6 of the tool socket 3 can be tightened and loosened with the assistance of the motor. In order to do this, the user actuates the main switch 14 so as to put the motor 8 into operation and moves a specially provided switching ring 25 that can be gripped from the outside out of a normal position 26 and into a tightening or loosening position 27. The motor 8 drives the clamping jaws 6 via the shaft 9. The rotational direction 21 of the shaft 9 determines whether the clamping jaws 6 move away from the working axis 5 in order to loosen the tool 2 or whether they approach the working axis 5 in order to tighten the tool 2. In the embodiment presented here, the user selects the rotational direction 21 of the shaft 9 by means of the selector switch 22; preferably, the clamping jaws 6 are clamped when they are turned clockwise and the clamping jaws 6 are loosened when they are turned counterclockwise.

The switching ring 25 is exclusively configured for switching over between the normal position 26 and the position 27 for tightening or loosening, that is to say, no other functional switching positions are associated with the switching ring. When the switching ring 25 is in the normal position 26, the clamping jaws 6 are stationary vis-à-vis the tool socket 3. The tool socket 3 is coupled to the shaft 9 and it rotates as soon as the motor 8 is switched on. The tool socket 3 rotates vis-à-vis the switching ring 25 that is in contact with the machine housing 13.

The two switching positions, namely, the normal position 26 and the position 27 for tightening or loosening, are preferably offset in the circumferential direction 21; preferably, the position 27 for tightening or loosening is offset to the left as seen in the working direction 28 vis-à-vis the normal position 26. The movement out of the normal position 26 is preferably carried out against a spring force.

The switching ring 25 annularly surrounds the tool socket 3 either partially or entirely. Thus, the switching ring 25 is immediately adjacent to the tool socket 3 along the outside of the electric screwdriver 1. In particular, the switching ring 25 and the tool socket 3 are not separated from each other by parts of the machine housing 13. For example, the switching ring 25 can cover the tool socket 3 over the entire axial length, as a result of which the only part of the tool socket 3 that can be freely gripped is its front end.

The switching ring 25 actuates a switchable coupling 29. The coupling 29 is part of the tool socket 3 and is secured or mounted in it. The coupling 29 always necessarily follows the rotational movement of the tool socket 3, that is to say, it is non-rotatable relative to the tool socket 3. The coupling 29 alternatingly couples the tool socket 3 either to the shaft 9 or to the machine housing 13. Examples of the structure of the coupling 29 are explained in conjunction with the figures below. The switching ring 25 is connected to the switchable coupling 29 in such a way that, in the normal position 26, the switchable coupling 29 engages with the shaft 9 and, in the position 27 for tightening or loosening, it engages with the machine housing 13. The switching movement of the switching ring 25 is converted by a link slide 30 into a radial or an axial movement that subsequently actuates the switchable coupling 29.

The clamping jaws 6 are guided in links 31 that are slanted relative to the working axis 5 and that run towards the working axis 5 in the working direction 28. The clamping jaws 6 are moved towards each other accordingly when the clamping jaws 6 are moved in the working direction 28. The clamping jaws 6 are unmovable in the circumferential direction 21 relative to the tool socket 3, that is to say, the tool socket 3 can introduce a torque into the clamping jaws 6.

The clamping jaws 6 are attached to a screw drive 32 that is coaxial to the working axis 5. The screw drive 32 comprises a carriage 33 that can move along the working axis 5. The clamping jaws 6 are secured in the carriage 33 and they follow its axial movement. The carriage 33 is positioned so as to be rotationally rigidly in the tool socket 3. Accordingly, the carriage 33 and the tool socket 3 rotate synchronously. The carriage 33 has a thread 34 that engages into a mating thread 35 of the shaft 9. The carriage 33 is moved axially relative to the shaft 9 when the carriage 33 and the shaft 9 rotate relative to each other. Otherwise, when the carriage 33 and the shaft are moving synchronously with each other, i.e. rotating together, the carriage 33 remains in its axial position 27. The shaft 9 and thus the screw drive 32 are constantly being driven. The relative rotation of the carriage 33 and the shaft 9 is brought about or prevented by the switchable coupling 29, depending on the switching position. When the switchable coupling 29 engages with the machine housing 13 (as opposed to shaft 9), the result is a rotation of the shaft 9 relative to the tool socket 3 and the carriage 33. The carriage 33 is moved axially by the screw drive 32. The clamping jaws 6 are tightened or loosened. When the switchable coupling 29 engages with the shaft 9 (as opposed to machine housing 13), the shaft 9 moves synchronously, i.e. rotates together, with the tool socket 3 and the carriage 33. The screw drive 32 remains in its axial position. The clamping jaws 6 remain in position and transmit a torque from the tool socket 3 to the tool 2.

The loosening and tightening of the tool 2 is preferably controlled by a special technical control method of the electric screwdriver 1.

The motor control unit 15 recognizes the position 26, 27 of the switching ring 25. The switching ring 25 given by way of example has a tab 36 that presses onto an electric track contact 37. The track contact is located on the machine housing 13. The track contact is arranged parallel to the direction of movement of the switching ring 25, here, in the circumferential direction 21, by way of example. The track contact 37 generates a different electric signal 39, for example, a resistance value, depending on the position of the adjusting ring 38. A preferred structure of the track contact 37 is described in conjunction with FIG. 8.

The motor control unit 15 activates the torque limiter 17 when the adjusting ring 38 is in the tightening or loosening position 27, and it sets the setpoint value for the torque to a value that is prescribed for the tightening of the clamping jaws 6. The torque is preferably limited to a switch-off value between 10 N/m and 15 N/m when the switching ring 25 is in the tightening or loosening position 27. This torque is too low for a typical application such as, for instance, screwing or drilling, but it is sufficient to tighten and loosen the clamping jaws 6. Exerting a greater torque does not achieve a better clamping force, but it does stress the tool 2 and the tool socket 3.

The motor 8 starts up as soon as the user actuates the main switch 14. Due to the switchable coupling 29, the clamping jaws 6 are tightened by means of the screw drive 32. The motor control unit 15 automatically deactivates the motor 8 indirectly via the torque limiter 17 when the torque fed back by the clamping jaws 6 reaches the switch-off value for the tightening. The control method is essentially the same for the loosening of the clamping jaws 6. The clamping jaws 6 run in a stop that detects a rise in the torque that serves to stop the motor 8. The switch-off value for the torque limiter 17 can be selected to be the same in both cases.

The torque limiter 17 and the motor control unit 15 can be in the form of a microprocessor with appropriate peripherals such as, for instance, voltage and current sensors.

The switching ring 25 can have a total of three positions, namely, two different positions 27 for the loosening and tightening as well as the normal position 26. The normal position 26 is preferably arranged between the two positions 27. Moreover, the switching ring 25 has a spring that returns the switching ring 25 to the normal position 26. The motor control 15 detects the individual position 27 and sets the rotational direction 21 of the motor in accordance with the function of tightening or loosening that has been selected by the user. In addition, the motor control unit 15 preferably sets the switch-off value for the torque limiter 17.

The electric screwdriver 1 presented here is equipped with an indexing mechanism 10. The user can select two, three or more speed reductions by means of a slide 40. The slide 40 has a tab 41 that runs on a track contact 42. The electric signal 43 of the track contact 42 is transmitted to the torque limiter 17, after which an associated control quantity is determined on the basis of the selected speed reduction. The torque limiter 17 takes the selected speed reduction into account so that the torque exerted against the shaft 9 does not exceed the switch-off value. Accordingly, in case of a high speed reduction, the torque limiter 17 regulates the torque generated by the motor 8 to a higher setpoint value than in case of a smaller speed reduction.

Figure 3:
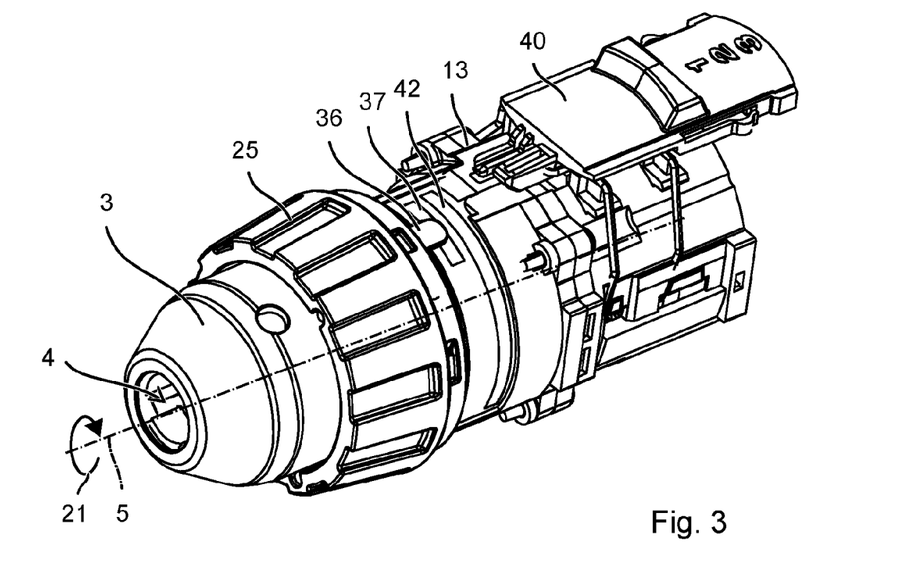
FIG. 3 a partial view of an embodiment.

By way of example, FIG. 3 shows a tool socket 3 of an electric screwdriver 1. The tool socket 3 is shown in two lengthwise sections in FIG. 4 in order to illustrate an operational mode, and in FIG. 5 in order to illustrate a tightening or loosening operation.

Figure 4:
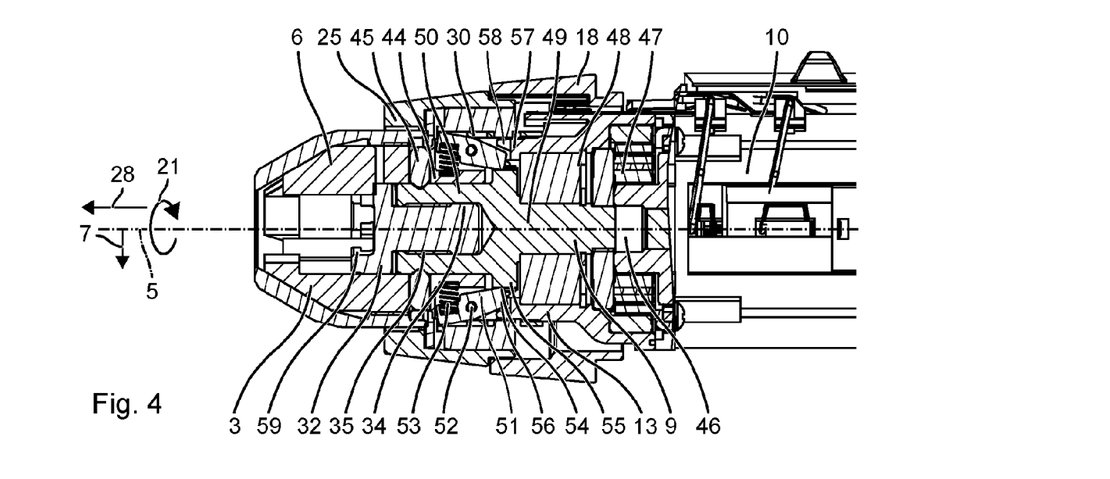
FIG. 4 the embodiment in a lengthwise section, in the normal position.
Figure 5:
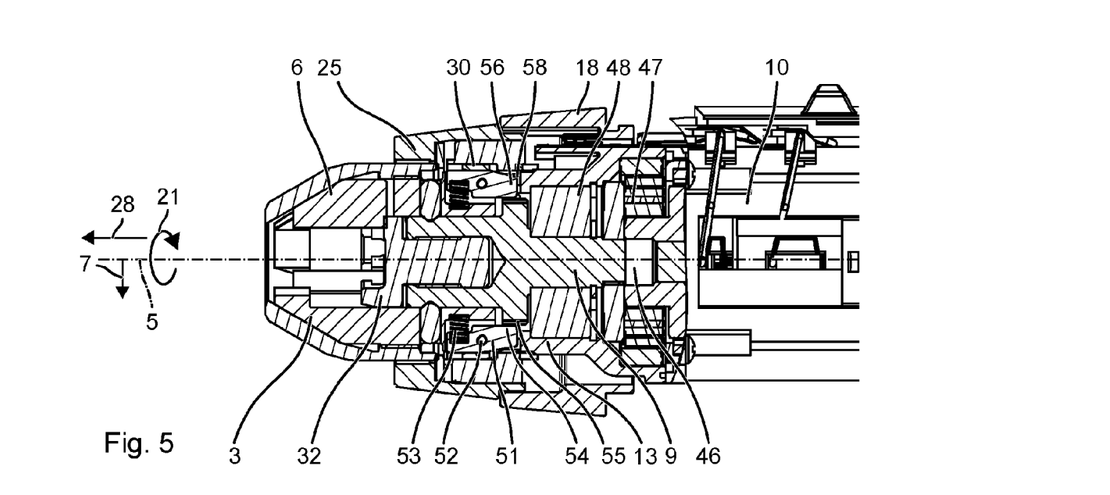
FIG. 5 the embodiment in a lengthwise section, in the tightening or loosening position.

The tool socket 3 is mounted on the shaft 9 so as to be freely rotatable. The tool socket 3 given by way of example has a cylindrical seat 44 with which it is placed directly onto the shaft 9. A snap ring 45 or bolt secures the axial position of the tool socket 3. The shaft 9 is permanently engaged with a gear 10. For example, the drive-side end of the shaft 9 is formed by a sun gear 46 of a planetary gear 47. The shaft 9 is rotatably mounted directly in a rotating bearing 48 in the machine housing 13. On the drive side, the shaft 9 has a fully cylindrical shank 49 and, on the driven side, it has a pot-shaped shank 50 that has an axial blind hole.

The switchable coupling 29 has several pawls 51 that are preferably arranged on a side facing the gear 10. The pawls 51 are attached to the tool socket 3 with pivot bearings 52. The pawls 51 can be pivoted against the spring 53 in the direction of the working axis 5. A spring 53 holds the pawl 51 in the normal position. The spring 53 is, for instance, in the form of a radially oriented coil spring, and as an alternative, the spring 53 can be a flexible ring such as, for example, an O-ring. The pawl 51 can be pivoted out of the normal position and into a deflected position. FIG. 4 shows the pawl 51 in the normal position, while FIG. 5 shows the pawl 51 in the deflected position.

The pawl 51 is provided with a tooth 54. The tooth 54 is provided on the drive-side end of the pawl 51. In the pawl 51 given by way of example, the tooth 54 faces the working axis 5. The shaft 9 is provided with radial teeth 55. When the pawl 51 is in the normal position, the tooth 54 engages with the teeth 55, as a result of which the pawl 51 couples the tool socket 3 rotationally rigidly to the shaft 9 in order to transmit a torque. When the pawl 51 is pivoted into the release position, the tooth 54 is disengaged from the teeth 55 of the shaft 9. The torque coupling is released.

The pawls 51 are provided with another tooth 56 (second tooth 56). When the pawl 51 is in the deflected position, the second tooth 56 engages with the machine housing 13. When the pawl 51 is in the normal position, the second tooth 56 is disengaged from the machine housing 13. The machine housing 13 serves to represent all of the components of the electric screwdriver 1 that are non-rotatably joined to the machine housing 13. The second tooth 56 is configured, for example, so as to project opposite to the working direction 28. The machine housing 13 has a ring 57 that has axial teeth 58 facing in the working direction 28.

The user can actuate the pawls 51 indirectly by means of the switching ring 25. The switching ring 25 is arranged around the tool socket 3 so that the user can grip it. With the switching ring 25 given by way of example, the normal position 26 and the tightening or loosening position 27 are offset in the circumferential direction 21. The adjusting ring 38 has a radially projecting contour 30 that runs helically in the circumferential direction 21. By means of the spring 53, the contour 30 can release (normal position 26; FIG. 4) or inhibit (tightening or loosening; FIG. 5) the deflection of the pawl 51. In the tightening or loosening position 27, the contour in the radial direction 7 is in contact with the leg of the link 31 that is pressed radially outwards by the spring 53.

In the normal position 26, the area that is in contact shifts to the other leg, which is pivoted radially inwards by the spring 53. The helical contour is configured for precisely two different switching positions. If there is a desire to make a distinction between a tightening position and a loosening position 27, two opposite helical contours can be provided that meet in a tip. The tip is for the normal position 26, whereas the two contours that run to the right and to the left define the tightening position and the loosening position.

The shaft 9 is coupled to the clamping jaws 6 by means of the screw drive 32. Depending on the rotational direction 21 of the shaft 9, the screw drive 32 moves in the working direction 28 or opposite to the working direction 28. In this process, owing to the links 31, the clamping jaws 6 are closed or opened.

The screw drive 32 comprises the carriage 33 that is arranged along the working axis 5 so as to move in the tool socket 3. The carriage 33 given by way of example is arranged on the working axis 5. The carriage 33 is provided with a preferably counterclockwise thread 34, here shown as an external thread by way of example. The shaft 9 has the mating thread 35 that is complementary to the thread 34, here shown as an internal thread by way of example. The mating thread 35 is drilled as a blind hole into the shaft 9. The two threads 34, 35 are non-detachably engaged. The shaft 9, which is constantly driven by the motor 8, transmits a torque to the carriage 33 via the threads 34, 35. If the carriage 33, in turn, does not exert any counter-torque, then the carriage 33 rotates together with the shaft 9 and holds its axial position. If the carriage 33 exerts a counter-torque, the result is a relative movement of the carriage 33 and the shaft 9, which brings about an axial movement of the carriage 33. The carriage 33 is connected to the clamping jaws 6. The carriage 33 given by way of example has several claws 59 that engage with the clamping jaws 6. The claws 59 couple the carriage 33 rotationally rigidly to the clamping jaws 6. The carriage 33 is mounted on the clamping jaws 6 correspondingly in the circumferential direction 21 and it exerts the counter-torque vis-à-vis the shaft 9. The carriage 33 travels along the working axis 5, moving the clamping jaws 6 in this process. The direction of movement of the carriage 33 depends on the rotational direction 21 of the shaft 9. In the case of the advantageous counterclockwise thread, the clamping jaws 6 are closed when the shaft 9 is turning clockwise, while the clamping jaws 6 are opened when the shaft 9 is turning counterclockwise.

The counterclockwise screw drive 32 additionally simplifies the structure. During screwing and drilling work, the shaft 9 runs clockwise. The screw drive 32 moves the carriage 33 until the clamping jaws 6 are in contact with the tool 2. After that, the carriage 33 is inhibited in the working direction 28. The axial inhibition causes the screw drive 32 to transfer a torque to the clamping jaws 6 in order to drive the tool socket 3. The torque is thus transmitted to the tool socket 3 partially via the switchable coupling 29 and partially via the screw drive 32. The teeth 54 on the shaft 9 would thus be optional for the clockwise operation. In order to allow applications with a counterclockwise drive, for example, in order to unscrew a screw, it is necessary to couple the tool socket 3 to the shaft 9.

Figure 6:
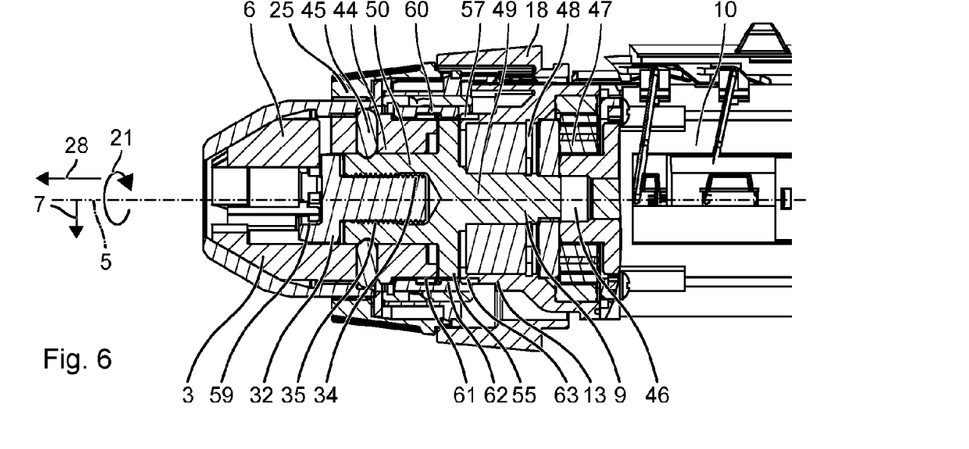
FIG. 6 an embodiment in a lengthwise section, in the normal position.
Figure 7:
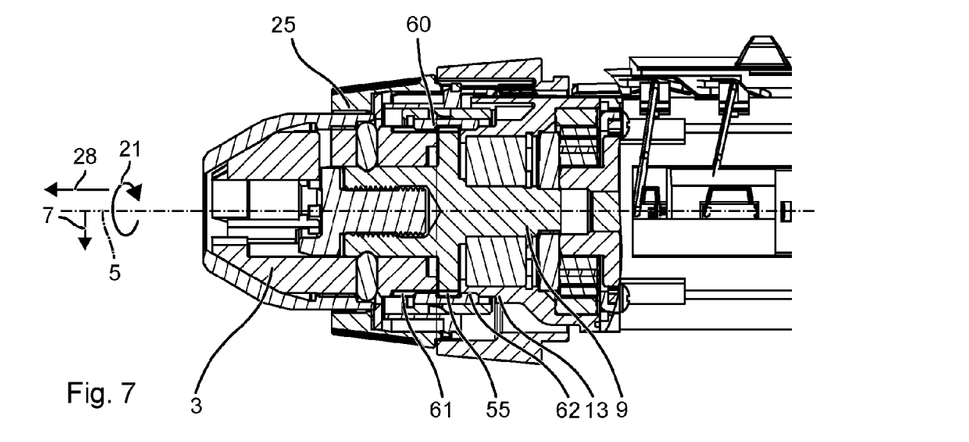
FIG. 7 the embodiment in a lengthwise section, in the tightening or loosening position.

The switchable coupling 29 can have one or more axially movable coupling elements (FIG. 6, FIG. 7) instead of or in addition to the pivoting pawls 51. The embodiment shown here and given by way of example is an internal gear 60. The tool socket 3 has an axial link 61 on which the internal gear 60 is mounted so as to slide axially. The internal gear can be moved between two positions corresponding to the normal position 26 (FIG. 6) and the tightening or loosening position 27 (FIG. 7). Like in the preceding embodiment, the internal gear 60 can be moved by means of a switching ring 25 and a contour. One or more springs can be provided that reset the actuation mechanism 25 to the normal position 26.

The internal gear 60 has teeth 62, preferably configured as radial teeth, that engage with the radial teeth 55 of the shaft 9. The engagement takes place only when the internal gear 60 is in the normal position. In the example shown, the internal gear 60 is in a rear position as seen in the working direction 28. In this example, the machine housing 13 has radial teeth 63 that are configured to be identical to the radial teeth 55 of the shaft 9 and that are arranged adjacent thereto. The teeth 62 of the internal gear 60 can be disengaged from the shaft 9 and can be engaged with the teeth 63 of the machine housing 13 (FIG. 7). The axial dimension of the teeth 62 of the internal gear 60 is the same as or less than the movement distance from the normal position 26 to the tightening or loosening position 27. In this manner, the teeth 63 are disengaged from the shaft 9 when the teeth 63 are engaged with the machine housing 13, or else the teeth 63 are engaged with the shaft 9 without being engaged with the machine housing 13.

The machine housing 13 can be provided with radial internal teeth into which radial external teeth of the internal gear 60 engage when in the tightening or loosening position 27.

Figure 8:
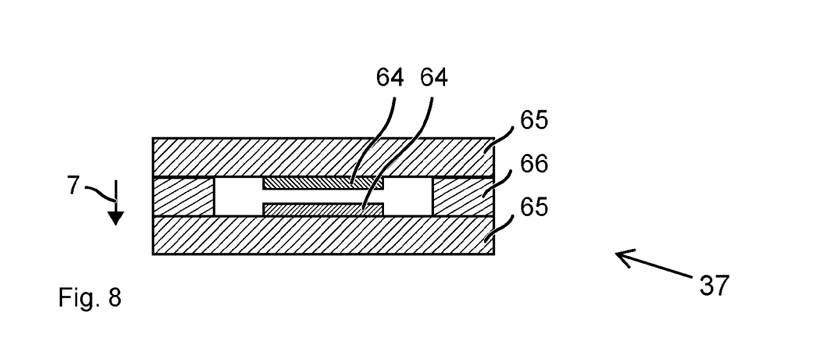
FIG. 8 a cross section through a track contact.
Figure 9:
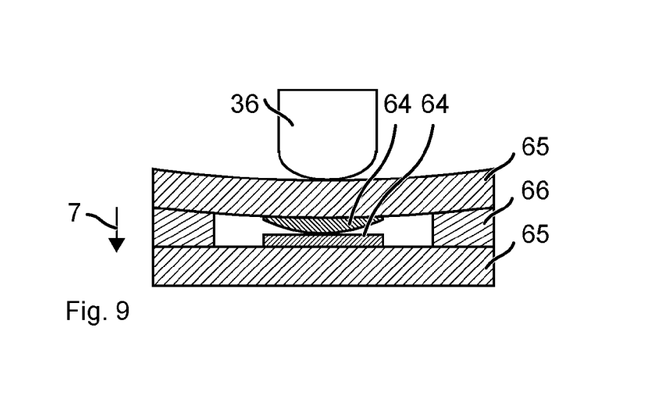
FIG. 9 a cross section through the track contact.

FIG. 8 and FIG. 9 show a cross section through the track contact 37. The track contact 42 has two conductor tracks that are at a distance from each other in the radial direction 7. The two conductor tracks 64 can each be applied, for example, onto a flexible film 65. Between the two films 65, there is another film 66 that is slit at the position of the conductor tracks 64. The tab 36 locally presses the two conductor tracks 64 together against each other, whereas elsewhere, the conductor tracks 64 are at a distance from each other due to the elasticity of the films 65, 66. One or both of the conductor tracks 64 can be configured as continuous carbon strips in order to determine the position based on the electric resistance.

What is claimed is:

1. A hand-held power tool comprising:
   a machine housing;
   a motor;
   a shaft driven by the motor;
   a tool socket mounted on the shaft and having a holding space to hold a tool, and having a clamping jaw situated in a link and projecting into the holding space;
   a carriage coupled to the clamping jaw and having a thread engaging into a mating thread of the shaft to form a screw drive;
   an actuator movable by a user between a first position and a second position; and
   a switchable coupling mounted non-rotatably on the tool socket and alternatingly engaging either with the shaft or with the machine housing, depending on the first and second positions of the actuator.

2. The hand-held power tool as recited in claim 1 wherein the tool socket is mounted on the shaft rotatably relative to the shaft.

3. The hand-held power tool as recited in claim 1 wherein the shaft is permanently coupled to the motor.

4. The hand-held power tool as recited in claim 1 wherein the shaft is connected directly to a gear or to the motor.

5. The hand-held power tool as recited in claim 1 wherein the shaft has teeth and the machine housing has machine housing teeth, the switchable coupling having a movable element with at least one set of further teeth, whereby, in a position corresponding to the first position, the at least one set engages with the teeth of the shaft and none of the at least one set engages with the machine housing, and whereby, in a position corresponding to the second position, none of the at least one set engages with the teeth of the shaft and the at least one set engages with the machine housing.

6. The hand-held power tool as recited in claim 1 wherein the shaft is configured in one piece.

7. The hand-held power tool as recited in claim 1 wherein the mating thread is configured as a blind hole in the shaft.

8. The hand-held power tool as recited in claim 1 wherein the actuator has an electric transmitter and a torque limiter limiting the torque output of the motor in response to the electric transmitter.

9. The hand-held power tool as recited in claim 8 wherein the actuator has a tab actuating a track contact.

10. A control method for a hand-held power tool having a tool socket with movable clamping jaws and an actuator for selecting between driving the tool socket and tightening or loosening the clamping jaws via a motor, the actuator including an electric transmitter generating a signal when tightening or loosening is selected, comprising the following steps:
  activating a torque limiter in response to the signal;
  limiting the torque output of the motor to a switch-off value coordinated with the tightening and loosening of the clamping jaws; and
  switching off the motor as soon as the switch-off value has been reached, wherein
  the hand-held power tool has an indexing mechanism with a further electric transmitter, whereby the further transmitter generates a further signal exhibiting a selected speed ratio, wherein the step of limiting the torque output of the motor takes into account the further signal transmitted by the indexing mechanism, in order to limit a torque output by the indexing mechanism to the switch-off value.

11. A hand-held power tool comprising:
a machine housing;
a motor;
a shaft driven by the motor;
a tool socket mounted on the shaft and having a holding space to hold a tool, and having a clamping jaw situated in a link and projecting into the holding space;
a carriage coupled to the clamping jaw and having a thread engaging into a mating thread of the shaft to form a screw drive;
an actuator movable by a user between a first position and a second position; and
a switchable coupling mounted on the tool socket and alternatingly engaging either with the shaft or with the machine housing, depending on the first and second positions of the actuator;
wherein the shaft has teeth and the machine housing has machine housing teeth, the switchable coupling having a movable element with at least one set of further teeth, whereby, in a position corresponding to the first position, the at least one set engages with the teeth of the shaft and none of the at least one set engages with the machine housing, and whereby, in a position corresponding to the second position, none of the at least one set engages with the teeth of the shaft and the at least one set engages with the machine housing.

* * * * *